United States Patent [19]

Noro

[11] Patent Number: 5,030,802
[45] Date of Patent: Jul. 9, 1991

[54] TURN SIGNAL APPARATUS

[75] Inventor: Yoshimi Noro, Aichi, Japan

[73] Assignee: Kabushiki Kaisha Tokai-Rika-Denki-Seisakusho, Aichi, Japan

[21] Appl. No.: 481,199

[22] Filed: Feb. 20, 1990

[30] Foreign Application Priority Data

Feb. 22, 1989 [JP] Japan .................. 1-20348[U]

[51] Int. Cl.⁵ .................. H01H 3/16; B60R 27/00
[52] U.S. Cl. .................. 200/61.27; 200/61.3; 200/61.35
[58] Field of Search .................. 200/61.27–61.38

[56] References Cited

U.S. PATENT DOCUMENTS

| | | | |
|---|---|---|---|
| 2,739,196 | 3/1956 | Spicer, Jr. ................ | 200/61.34 |
| 3,264,422 | 8/1966 | Masserant, Jr. et al. ..... | 200/61.34 |
| 3,557,328 | 1/1971 | Winogrocki et al. ........ | 200/61.27 |
| 3,604,867 | 9/1971 | Suzuki ................... | 200/61.34 |
| 3,794,785 | 2/1974 | Tomlinson ................ | 200/61.35 X |
| 4,739,131 | 4/1988 | Maeda .................... | 200/61.34 X |
| 4,855,542 | 8/1989 | Furuhashi et al. ......... | 200/61.27 |

FOREIGN PATENT DOCUMENTS

57-199146 12/1982 Japan .

Primary Examiner—J. R. Scott
Attorney, Agent, or Firm—Sixbey, Friedman, Leedom & Ferguson

[57] ABSTRACT

A turn signal apparatus for returning a turn lever to its neutral position by the rotation of a steering shaft in a return direction as the turn lever is rotated at the time of making a change in the forward direction of a vehicle. A ratchet which is brought into a rotating path of a cancellation cam of the steering shaft by the manipulation of a turn lever is interposed between the turn lever and the steering shaft. The ratchet and a pair of arms are oppositely urged by an urging spring. The ratchet which is rotated by the cancellation cam at the time of rotation of the steering shaft in the returning direction imparts its rotating force to the turn lever via one of the arms urged by the urging spring. Since the arm boosts the rotating force of the ratchet in transmitting the rotating force to the turn lever, a steering shaft rotating force required for returning the turn lever is minimized.

20 Claims, 5 Drawing Sheets

TURN SIGNAL APPARATUS

BACKGROUND OF THE INVENTION

1. Field of the Invention

The present invention relates to a turn signal apparatus having a turn lever operable for indicating a change in direction of a forward moving vehicle and which is adapted to automatically return to its neutral position when a steering shaft is rotated in an opposite direction.

2. Background Information

Self-cancelling devices for turn signal switches are generally arranged such that a bracket formed in such a manner as to surround a steering shaft is swingably supported on a base. A turn lever is fixed to one side portion of the bracket, and a ratchet of a self-cancelling device is disposed on an opposing side thereof. When the bracket is displaced by a turn lever to the left-turn indicating position or right-turn indicating position, a ratchet pawl is positioned in a rotating path of a projectin of a cancellation cam. Then, when the cancellation cam is rotated in an opposite direction to the direction of the turn lever by the operation of the steering wheel in a returning direction, the cancellation cam presses the ratchet pawl, thereby allowing the bracket and, hence, the turn lever, to be returned to their neutral positions. In the above-described arrangement, however, since the bracket is formed in such a manner as to surround the steering shaft, there is a problem in that the apparatus becomes large in size.

A conventional apparatus disclosed in Japanese Utility Model Laid-Open No. 199146/1982 is known in which improvements were made on this aspect (see FIG. 6). A bracket 3 formed of a plastic is swingably supported about a shaft 2 so that the bracket 3 is located on one side of the steering shaft 1. The arrangement is such that the bracket 3 is rotated from the neutral position to the right-turn indicating position or the left-turn indicating position by means of a turn lever 4 secured to the side of the bracket 3 most distant from the side where the steering shaft 1 is located. In addition, an engaging member 5 having an end 5a oriented toward the steering shaft 1 side is movably provided on the bracket 3 at a position on the steering shaft 1 side. A pair of elastic deformable engaging arms 6 are integrally provided on the bracket 3. These engaging arms 6 are opposed to the other end 5b of the engaging member 5. The arrangement is such that when the bracket 3 is rotated from the neutral position to the right-turn indicating position or the left-turn indicating position, one end 5a of the engaging member 5 is located in the rotating path of the projection 1a of the steering shaft 1. When the steering shaft 1 is rotated in the same direction as the turning direction, the other end 5b of the engaging member 5 is swung between the engaging arms 6, 6. When the steering shaft 1 is rotated in the opposite direction to the turning direction, the projection 1a is brought into contact with one end 5a of the engaging member 5, thereby allowing the other end 5b to be engaged with either of the engaging arms 6. Hence, the bracket 3 is returned to its neutral position.

In the above-described arrangement, however, when the turn lever 4 is self-canceled, the other end 5b of the engaging member 5 is arranged to move the engaging arm 6 of the bracket 3. For this reason, a large load weighing, for example, 8 kg is required for rotating the engaging member 5, so that a large frictional force acts between the engaging member 5 on the one hand, and the projection 1a and the engaging arm 6 on the other, with the result that the engaging member 5 is liable to undergo abrasion and is therefore inferior in terms of durability. In addition, there has been another drawback in that a large manipulating force for returning the steering wheel is required.

SUMMARY OF THE INVENTION

Accordingly, an object of the present invention is to provide a turn signal apparatus having a mechanism for self-canceling a turn signal switch making it possible to reduce a load acting on a ratchet at the time of self-cancellation, thereby reducing the abrasion of the ratchet and improving its durability, and making it possible to reduce manipulation force for returning a steering wheel.

To this end, in accordance with the present invention, a turn lever and a ratchet are arranged on one side of a steering shaft. The ratchet is moved into a cancel cam rotating path of the steering shaft by a swinging operation of the turn lever by the driver. Accordingly, when the steering shaft is rotated in a returning direction, the ratchet receives the rotating force. This rotating force is transmitted to the turn lever via an arm. Specifically, this force is transmitted to the turn lever via a power boosting mechanism whereby the arm is brought into contact with the turn lever at a portion close to the center of rotation, and is brought into contact with the turn lever at a portion distant therefrom. For this reason, the turn lever is returned to its neutral position with a light manipulating force for returning the steering wheel.

DESCRIPTION OF THE PREFERRED EMBODIMENT

Figure 1:
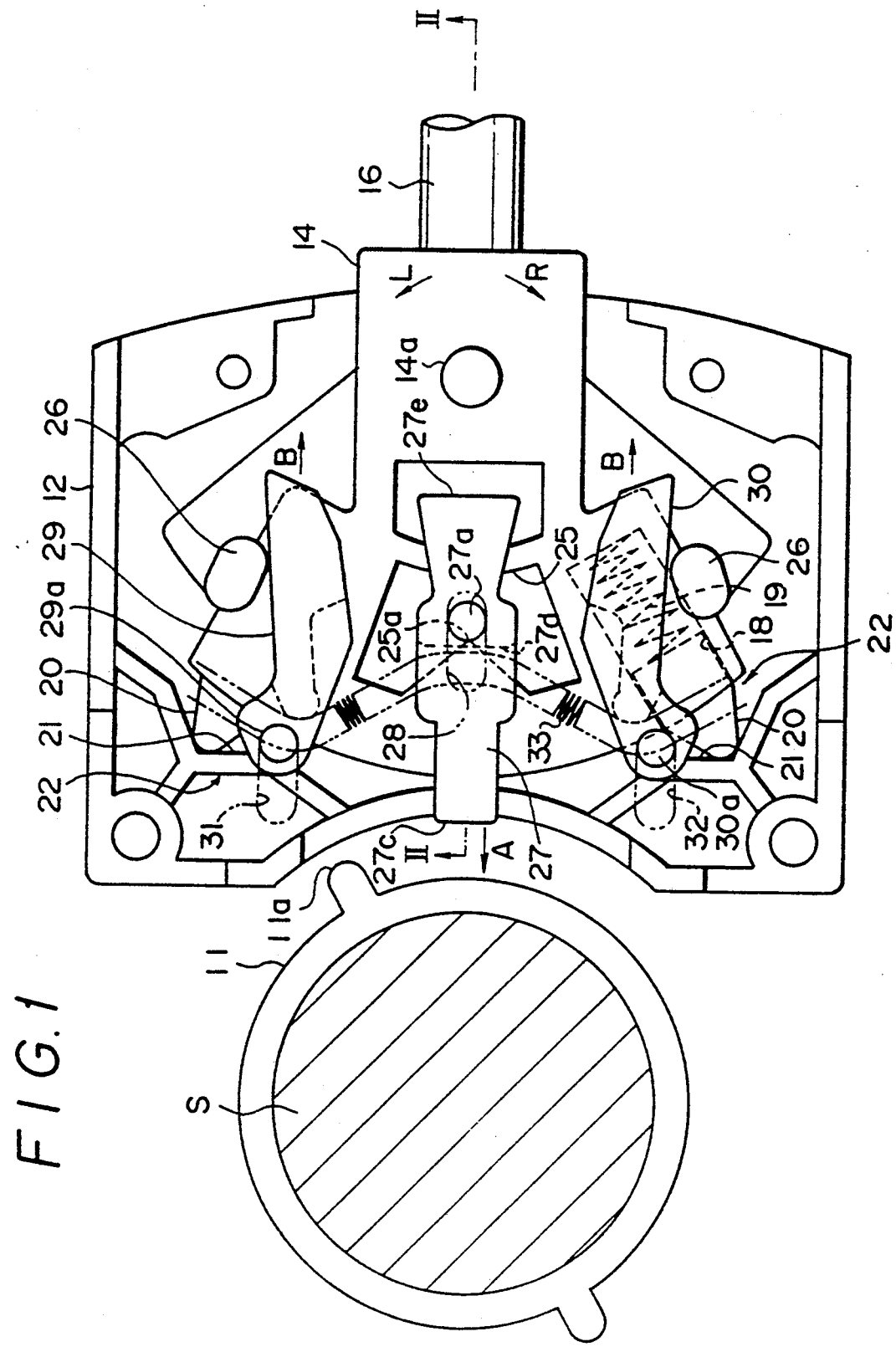
FIG. 1 is a front elevational view, as viewed in the direction of steering shaft, of a turn signal apparatus, with a cover removed, in accordance with an embodiment of the present invention.
Figure 2:
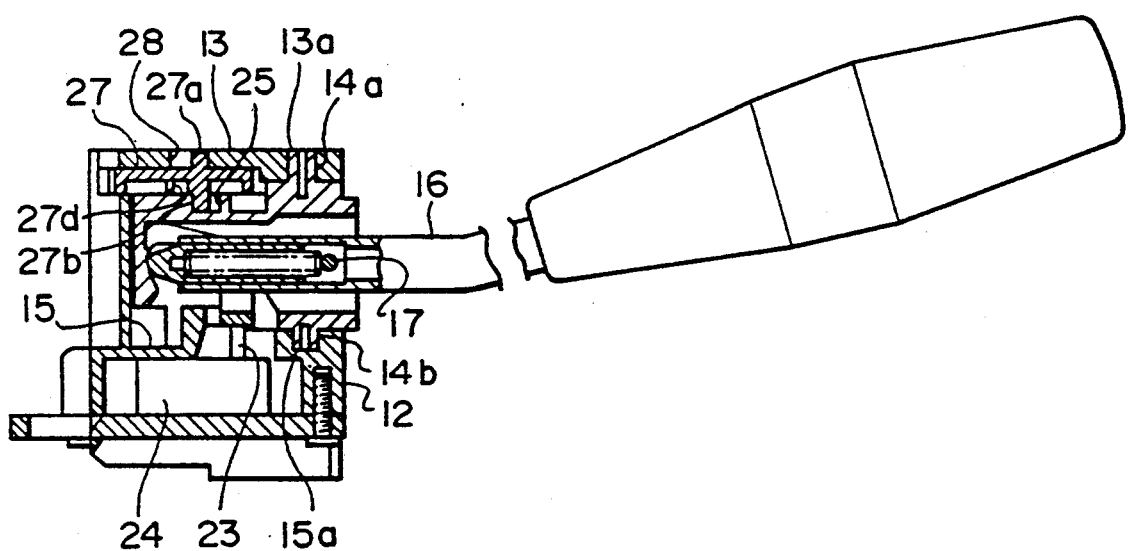
FIG. 2 is a cross-sectional view taken along line II—II of FIG. 1.
Figure 3:
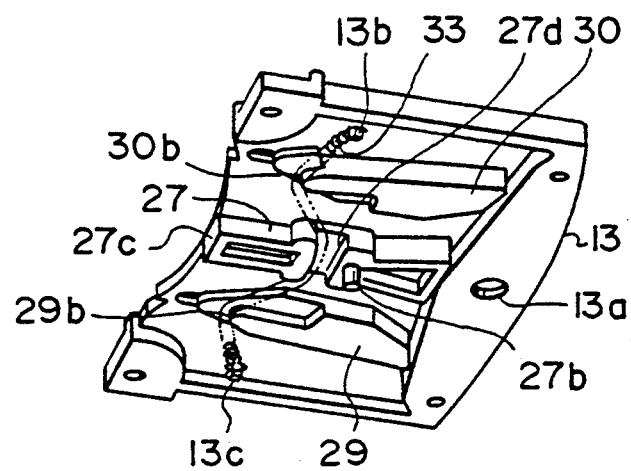
FIG. 3 is a perspective view illustrating a turn signal device in accordance with the embodiment.
Figure 3:
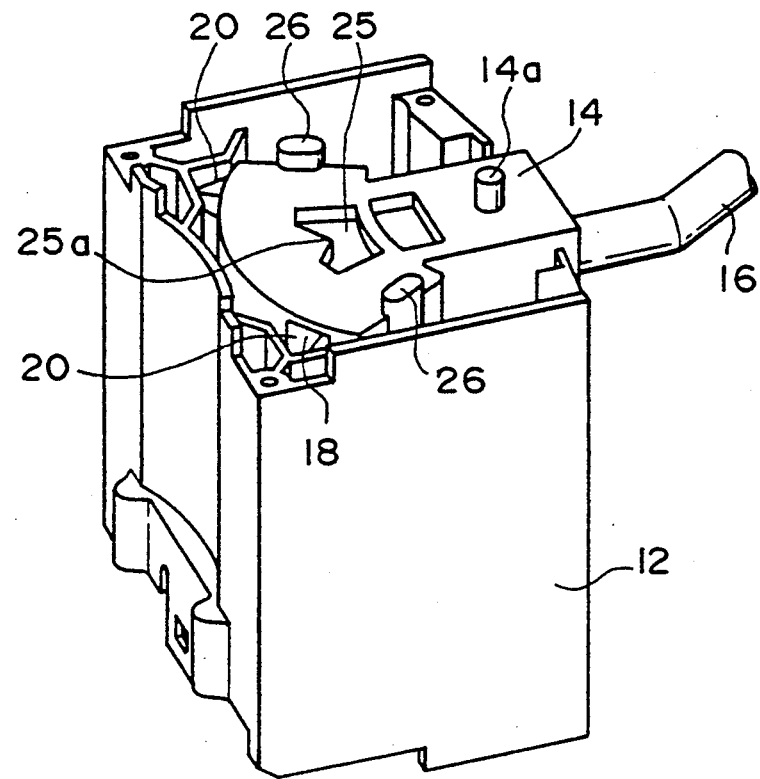

In FIG. 1, a cancellation cam 11 is secured to a steering shaft S which is rotated by the rotation of an unillustrated steering wheel. The projections 11a are formed on an outer peripheral portion of the cancellation cam 11. A box-shaped frame 12 disposed in a peripheral portion of the cancellation cam 11 is supported by a vehicle chassis via a bracket or the like(not shown). As shown in FIGS. 2 and 3, a cover 13 is secured to the frame 12 via screws in such a manner as to close an upper surface of the frame 12. A plastic bracket 14 is disposed in the frame 12. Protruding pins 14a, 14b are provided respectively on upper and lower surfaces of the bracket 14. Pin 14a is fitted rotatably into a hole 13a provided in the cover 13 while pin 14b is provided in a hole 15a. Hole 15a is provided in the partition wall 15 of the frame 12. As a result, the bracket 14 is rotatable from its neutral position (FIG. 1) to the left-turn indicating position, i.e., in the direction of arrow L (FIG. 4), and to the right-turn indicating position, i.e., in the direction of arrow R. A turn lever 16 projects laterally from the frame 12. The turn lever 16 is supported at its proximal end by the bracket 14 via a pin 17 in such a manner as to be rotatable about its axis which is perpendicular to the axis of the pin 14a so as to be used for operating a dimmer/passing switch. A pair of click pushers 20, which are each urged outwardly by a spring 19 incorporated in the bracket 14, are respectively inserted in two holes 18 formed in side portions of the bracket 14 at positions close to the steering shaft S. A pair of recessed portions 21 are respectively formed on opposing side portions of the frame 12, and the click pushers 20 are arranged to engage therewith. The spring 19, the click pusher 20, and the recessed portion 21 thus constitute a clicking mechanism 22. A turn switch (not shown), whose state is changed in interlocking relation with the rotation of the bracket 14 about the pin 14a, is disposed on a lower portion of the partition wall 5 of the frame 12. In addition, provided inside the frame 12 is a dimmer/passing switch 24, whose state is changed by means of an actuating shaft 23 provided on a distal end of the turn lever 16.

A guide recessed portion 25 is provided in a central portion of an upper surface of the bracket 14. A side surface of the guide recessed portion 25 on the steering shaft S side is formed as a guide projection 25a projecting toward the turn lever 16. A pair of actuating projections 26 are provided on opposite sides of the bracket 14 with the guide recessed portion 25 placed therebetween. A ratchet 27 is interposed between an upper surface of the bracket 14 and the cover 13. The ratchet 27 extends in a radial direction of the steering shaft S, and has shaft portions 27a, 27b that are formed projectingly on upper and lower surfaces of its longitudinally intermediate portion in mutually concentric relation. The shaft portions 27a, 27b have axes that are parallel with the axis of the steering shaft S, the shaft portion 27a being slidably and rotatably inserted in a slot 28 provided in a central portion of the cover 13 in such a manner as to extend in a radial direction of the steering shaft S. Meanwhile, the shaft portion 27b is inserted in the guide recessed portion 25. One end 27c of the ratchet 27 is oriented toward the cancellation cam 11. A spring holding groove 27d is formed in a lower surface of the ratchet 27 in the vicinity of the shaft portion 27b in such a manner as to extend substantially perpendicular to the longitudinal direction of the ratchet 27.

Two arms 29, 30 are interposed between the upper surface of the bracket 14 and the cover 13. Shaft portions 29a, 30a provided projectingly on proximal ends thereof are respectively supported slidably and rotatably in slots 31, 32 that are formed in the cover 13 and are substantially in parallel with the slot 28 with the slot 28 placed therebetween. These distal ends extend in directions away from the steering shaft S and are located between the actuating projection 26 and the other end portion 27e of the ratchet 27. Spring holding stepped portions 29b, 30b are provided at these proximal ends in such a manner as to project toward the steering shaft S. A spring belt 33 formed by winding a spring wire into the form of a coil is arranged such that its opposite ends are respectively retained at spring retaining projections 13b, 13c provided projectingly on the cover 13 and its intermediate portion is held in the spring holding groove 27d of the ratchet 27 and on the spring holding stepped portions 29b, 30b Accordingly, the ratchet 27 is urged in the direction of arrow A, i.e., in the direction of the cancellation cam 11, while the arms 29, 30 are urged in an opposite direction to that of the ratchet 27, i.e., in the direction of arrow B.

The operation of the above-described arrangement will be described hereinunder.

When the turn lever 16 is in its neutral position, as shown in FIG. 1, the shaft portion 27b of the ratchet 27 is opposed to the guide projection 25a of the guide recessed portion 25. Consequently, the ratchet 27 is displaced in a direction away from the steering shaft S (in an direction opposite to the direction of arrow A) against the spring force of the spring belt 33, and its one end 27c is located outside the rotating path of the projections 11a of the cancellation cam.

Figure 4:
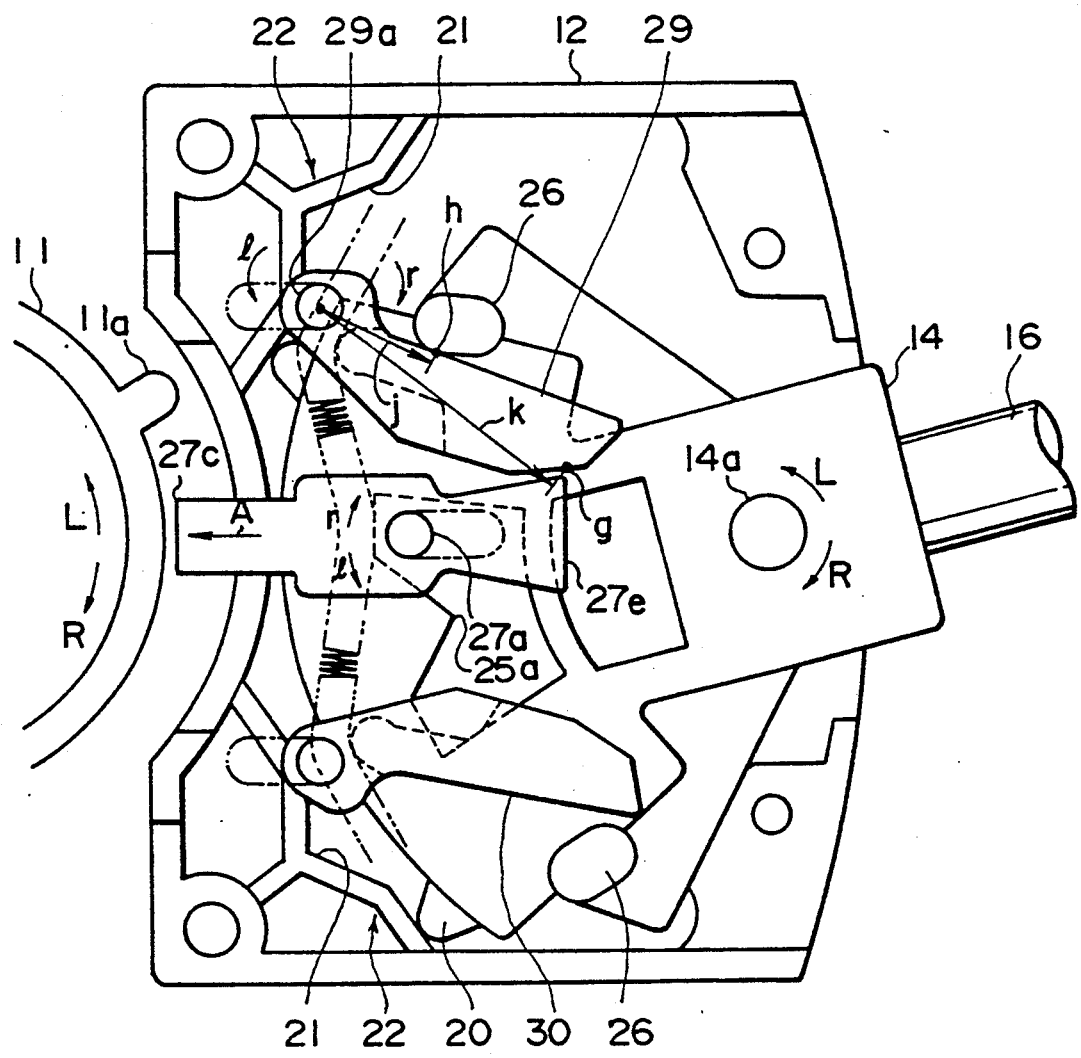
FIG. 4 is an operational diagram in which a turn lever, shown in FIG. 1 is in the left-turn indicating position.

As shown in FIG. 4, when the turn lever 16 is rotated in the direction of a left-turn indicating position, i.e., in the direction of arrow L, the bracket 14 is also rotated in the direction of arrow L, which in turn causes the unillustrated turn switch to be operated, allowing a turn signal light to light. In this state, as shown in FIG. 4, the shaft portion 27b of the ratchet 27 is disengaged from the guide projection 25a and is displaced in the direction of arrow A owing to the spring force of the spring belt 33, allowing the one end 27c of the ratchet 27 to be located in the rotating path of the projections 11a of the cancellation cam 11. Concurrently, the distal end of the arm 29 is rotatively displaced about the shaft portion 29a in the direction of arrow r by means of one of the actuating projections 26 (located on the upper side in FIG. 4), so that the distal end of the arm 29 is held in proximity to the other end 27e of the ratchet 27. The other arm 30 remains located between the other actuating projection and the ratchet 27 in such a manner as to be spaced apart an equal distance from both of them.

In this state, when the cancellation cam 11 is rotated together with the steering shaft S by the unillustrated steering wheel in the direction of arrow L, i.e., in the same direction as the direction of the operated turn lever 16, the projection 11a of the cancellation cam 11 is brought into contact with the one end 27c of the ratchet 27. Consequently, the ratchet 27 is rotated in the direction of arrow r against the resiliency of the spring belt 33 and rides over the projection 11a. At this time, even when the ratchet 27 returns to its neutral position after rotating in the direction of arrow r, the ratchet 27 does not abut the arm 29, and the bracket maintains its state in which it is rotated in the direction of arrow L as shown in FIG. 4.

Subsequently, when the return rotation of the unillustrated steering wheel causes the cancellation cam 11 to rotate in the direction of arrow R, i.e., in the direction opposite to the direction of the operated turn lever 16, and the projection 11a is brought into contact with the ratchet 27, the ratchet 27 is rotatively displaced about the shaft portion 27a in the direction of arrow l. In conjunction with the rotation of the ratchet 27, the other end 27e of the ratchet 27 is brought into contact with the arm 29 at an abutting point g to cause the arm 29 to rotate about the shaft portion 29a in the direction of arrow l. Since this rotation of the arm 29 is transmitted to the one actuating projection 26, which is provided on the bracket 14 and is adapted to abut the arm 29 at an abutting point h, the bracket 14 is rotated in the direction of arrow R and is returned to its neutral position shown in FIG. 1, thereby effecting self-cancellation.

Dimensions of the respective parts are set in such a manner that a distance j from a fulcrum for the rotation of the arm 29, i.e., the shaft portion 29a, to the abutting point h between the arm 29 and the actuating projection 26 is smaller than a distance k from the shaft portion 29a to an abutting point g between the arm 29 and the other end 27e of the ratchet 27. Consequently, the rotating force acting on the ratchet 27 is amplified by the arm 29 before it acts on the actuating projection 26. Accordingly, the load acting on the ratchet 27 for returning the bracket 14 is reduced in proportion to the ratio between the distances j and k as compared with the load in cases where the bracket 14 is directly rotated.

A description will now be given of a case where the turn lever 16 is held by the driver so that it will not return in the opposite direction to that of arrow L with the turn lever 16 rotated in the direction of arrow L, as shown in FIG. 4, and the cancellation cam 11 is rotated in the direction of arrow R by means of the unillustrated steering wheel in this state. When the projection 11a is brought into contact with the one end 27c of the ratchet 27, the ratchet 27 rotates about the shaft 27a in the direction of arrow l. In this case, however, an intermediate portion of the arm 29 is brought into contact with the one actuating projection 26 provided on the bracket 14, thereby restricting any further rotation of the arm 29 in the direction of arrow l.

Figure 5:
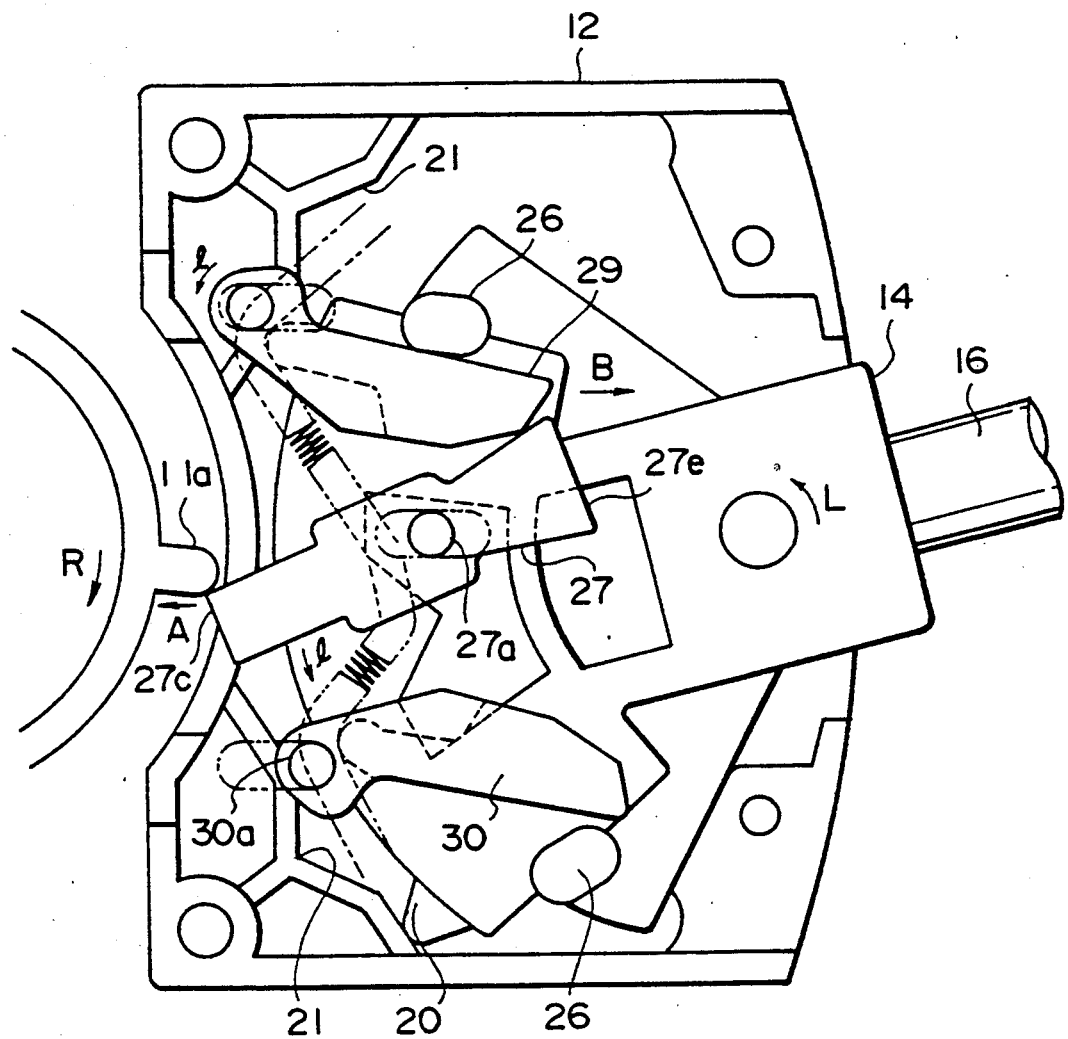
FIG. 5 is an operational diagram in which the turn lever is operated in the opposite direction to that of FIG. 4.
Figure 6:
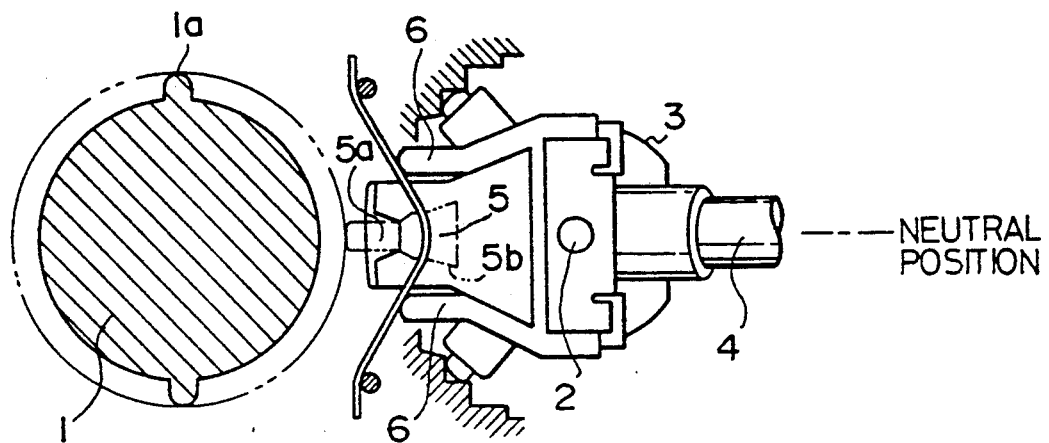
FIG. 6 is a front elevational view illustrating an example of the prior art.

Accordingly, as shown in FIG. 5, the ratchet 27, while rotating in the direction of arrow l, is displaced in the opposite direction to that of arrow A, i.e., in the direction away from the cancellation cam 11, against the resiliency of the spring belt 33. In conjunction with this displacement, the arm 29 is moved in the opposite direction to that of arrow B against the resiliency of the spring belt 33, with the result that the ratchet 27 is capable of riding over the projection 11a of the cancellation cam 11.

Since the movement of the ratchet 27 and the arm 29 in this case is effected against the resiliency of the spring belt 33 formed of a metal which undergoes relatively little temperature change or change with time, the load required in their movement is stable, so that no adverse influence is exerted on the manipulation of the steering wheel.

The above description has been given of cases where the turn lever 16 is manipulated in the direction of a left turn, i.e., in the direction of arrow L. In cases where the turn lever 16 is manipulated in the direction of a right turn, the operation of the respective members becomes merely transversely symmetrical with the ratchet 27 as a center, so that a detailed description will be omitted.

Thus, in accordance with the above-described arrangement, the rotating force acting on the ratchet 27 is amplified by the arm 29 before it acts on the actuating projection 26. Accordingly, the load acting on the ratchet 27 for returning the bracket 14 at the time of self cancellation can be reduced in proportion to the ratio between the distances j and k as compared with cases where the bracket 14 is directly rotated. As a result, wear on the ratchet 27 is alleviated, so that durability can be improved. The manipulating force for returning the steering wheel can also be alleviated. In addition, in the above-described arrangement, since the ratchet 27 and the arms 29, 30 are urged by means of the metal spring belt 33, the load occurring when the ratchet 27 and the arms 29, 30 are moved against its urging force is subjected to substantially no influence of temperature change or change with the passage time, so that a stable manipulating force can be obtained.

What is claimed is:

1. A turn signal apparatus, indicating a change in the forward direction of vehicle, for automatically returning a turn lever to a neutral position by means of a cancellation cam provided on a steering shaft by the manipulation of a steering wheel comprising:
    a frame disposed adjacent to one side of the steering shaft;
    a turn lever disposed in said frame and supported thereby to be rotatable from its neutral position by being manipulated by a driver at the time of changing the direction of a forward moving vehicle, said turn lever being comprised of a bracket and a pair of actuating projections spacedly provided, said bracket having a guide means comprised of a guide recess and a guide surface;
    a ratchet disposed on said bracket and interposed between said turn lever and said steering shaft, one end of said ratchet being movable slidably into and out of the rotating path of said cancellation cam provided on said steering shaft, said ratchet being subjected to a rotating force by said cancellation cam as said steering shaft is rotated in a returning direction;
    urging means attached to said frame; and
    power boosting means comprising a pair of arms attached to said frame and movable relative to the frame, the actuating projections and the ratchet, with said arms and said ratchet being urged in relatively opposite directions by said urging means, said power boosting means being interposed between said ratchet and said actuating projections of said turn lever during rotation of said turn lever to boost a rotating force of said ratchet during said rotation of said steering shaft in the returning direction so as to impart the rotating force to one of said actuating projections of said turn lever as a force for returning said turn lever to its neutral position, whereby said turn lever is automatically returned to its neutral position by the action of said boosting means as a result of a light rotating force of said steering wheel acting in an opposite direction to the advancing direction of the vehicle indicated by the manipulation of said turn lever.

2. A turn signal apparatus according to claim 1, wherein said arms of said power boosting means are attached pivotally at a center of rotation to said frame so that during operation said arms are brought into contact with said turn lever at a point on said arm more nearly adjacent than said ratchet to the center of rotation of the arm.

3. A turn signal apparatus according to claim 2, wherein said actuating projections project from said bracket of said turn lever, and are brought into contact with said arms, side by side.

4. A turn signal apparatus according to claim 3, wherein each said arm has a pivotally supporting portion which is disposed in the vicinity of said steering shaft and extends therefrom in a direction away from said steering shaft, and said extended portion is located between said ratchet and said projection of said turn lever.

5. A turn signal apparatus according to claim 2, wherein an axis of said arm is movable by the force imparted from said ratchet in opposition to the urging force of said urging means when said turn lever is prevented from returning to its neutral position.

6. A turn signal apparatus according to claim 5, wherein said urging means is comprised of a tensile spring, and each said arm has a shaft portion which abuts an intermediate portion of said tensile spring is resiliently attached so that the urging force is transmitted to the arm through the shaft portion.

7. A turn signal apparatus according to claim 1, wherein said ratchet is movable in a radial direction of said steering shaft, and its intermediate portion is pivotally supported so as to allow said ratchet to be rotatable.

8. A turn signal apparatus according to claim 7, wherein a force urging the ratchet toward said steering shaft is transmitted to the ratchet by a center portion of said urging means attached to said ratchet and disposed radially with respect to said steering shaft.

9. A turn signal apparatus according to claim 6, wherein said ratchet is pivotally supported with longitudinal axis parallel to an axis of said steering shaft, and one end of said ratchet away from said steering shaft serves as an abutting portion for abutment against said arm.

10. A turn signal apparatus according to claim 1, wherein said ratchet receives the urging force of said urging means in the direction of said steering shaft, said guide means spacing said ratchet apart from said steering shaft when said turn lever is in its neutral position.

11. A turn signal apparatus according to claim 3, wherein said arm extends in a direction away from the vicinity of said steering shaft and is inserted between said ratchet and said projection of said turn lever.

12. A turn signal apparatus according to claim 2, wherein the urging means is a spring belt, and said arm receives an urging force at a contact point of the arm where the arm abuts an intermediate portion of the spring belt retained on said arm, said spring belt being adapted to urge said ratchet at said contacted intermediate portion of said spring belt in a direction away from said steering shaft, said spring belt wound in the form of a coil around its central longitudinal axis, and an axis of said arm moved against said urging force when said turn lever is prevented from returning to its neutral position.

13. A turn signal apparatus according to claim 1, wherein said turn lever, said ratchet, and said arm are supported on a frame which is mounted on a chassis of the vehicle.

14. A turn signal apparatus for indicating a turning direction of a vehicle, comprising:
   a frame mounted on a chassis of the vehicle;
   a turn lever having a bracket and a pair of actuating projections spacedly provided therebetween, and axially supported on said frame and rotatively manipulated by a driver from a neutral position to one direction or the other, said bracket having a guide means comprised of a guide recess and a guide surface;
   a ratchet which is supported between said frame and said guide means being interposed between said turn lever and a cancellation cam of said steering shaft to move along said guide surface of said guide means, one end of said ratchet being moved to the rotating path of said cancellation cam by the manipulation of said turn lever, said ratchet being subjected to a rotating force as said steering shaft is rotated in a returning direction;
   urging means attached to said frame;
   a pair of arms pivotally supported on said frame to receive a rotating force of said ratchet when said steering shaft is rotated in the returning direction, and thereby imparts the rotating force to said turn lever as a force for returning said turn lever to its neutral position, said arms and said ratchet urged in opposite directions by said urging means; and
   power boosting means for imparting the rotating force to said turn lever as a large rotating force, said power boosting means including said pair of arms, said actuating projections and said ratchet.

15. A turn signal apparatus according to claim 14, said power boosting means is so arranged that a portion of said arm adjacent to center of rotation thereof is brought into contact with said turn lever, and a portion of said arm distant therefrom is brought into contact with said ratchet, thereby boosting the rotating force of said ratchet by means of the action of a lever.

16. A turn signal apparatus according to claim 14, wherein said arm has one side serving as an abutting portion for abutting against a projection projecting from said turn lever and the other side serving as an abutting portion for abutting against said ratchet.

17. A turn signal apparatus according to claim 14, wherein said urging means is comprised of a spring belt, and said arm is so arranged that its axial portion secured to said frame is movable by the force imparted from said ratchet in opposition to the urging force of said spring belt so as to provide release in a case where a large external force acts on said arm.

18. A turn signal apparatus according to claim 17, wherein said arm receives the urging force at an intermediate portion of said spring belt wound in coil form around its axis.

19. A turn signal apparatus according to claim 18, wherein said ratchet receives the urging force from the intermediate portion of said spring belt and is urged in a direction toward said cancellation cam.

20. A turn signal apparatus capable of cancelling an indication of a change in the forward direction of a vehicle by the rotation of a steering wheel in a return direction, said apparatus comprising:
   a frame mounted on a chassis of a vehicle;
   a turn lever pivotally supported on said frame for rotation from a neutral position in one direction or the other in correspondence with the intended change in the forward direction of the vehicle;
   a ratchet which is interposed between said turn lever and a steering shaft, is pivotally supported on said frame, and is made capable of approaching or moving away from said steering shaft;
   a spring having opposite ends secured to said frame, an intermediate portion thereof being retained at said ratchet, said spring urging said ratchet toward a cancellation cam of said steering shaft so that said ratchet is rotated in the returning direction by the rotation of said steering shaft.
   guide means having a guide recess and a guide surface and associated with said turn lever and said ratchet, guide surface of said guide means out of a rotating path of said cancellation cam against an urging force when said turn lever is set in its neutral position; and
   an arm which is pivotally supported on said frame, an extended portion thereof being interposed between said turn lever and said ratchet, wherein said arm boosts the rotating force of said steering shaft in the return direction so as to transmit a rotating force as a force for returning said turn lever to its neutral position.

* * * * *